INVENTOR.
STANLEY E. KEAGLE
BY
G. H. Braddock
ATTORNEY

Jan. 6, 1948.　　　　S. E. KEAGLE　　　　2,433,912
FEEDER
Filed Feb. 5, 1945　　　　2 Sheets-Sheet 2
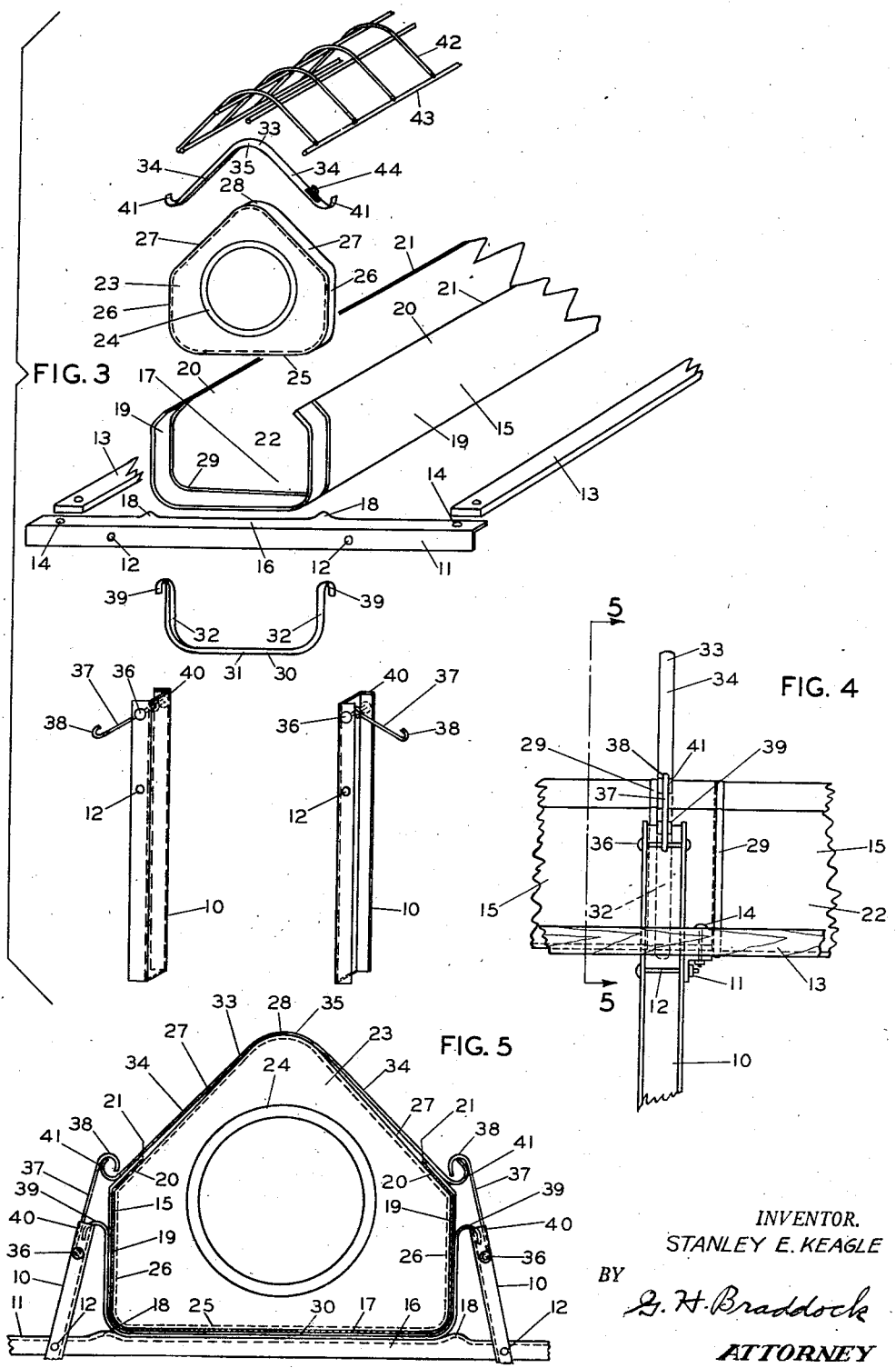
INVENTOR.
STANLEY E. KEAGLE
BY
G. H. Braddock
ATTORNEY Patented Jan. 6, 1948

2,433,912

UNITED STATES PATENT OFFICE 2,433,912

FEEDER

Stanley E. Keagle, Minneapolis, Minn.

Application February 5, 1945, Serial No. 576,196

9 Claims. (Cl. 119—61)

This invention has relation to a feeder useful for many purposes but designed to be more especially useful to the purpose of receiving materials intended to be fed to chickens or other fowl.

An object of the invention is to provide a feeder for receiving materials which will be of simple and inexpensive construction and an improvement generally over feeders for the same purposes heretofore known.

A further object is to provide a feeder wherein will be incorporated various improved features and characteristics of construction novel both as individual entities of the feeder and in combination with each other.

And a further object is to provide a feeder of construction as herein presented.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 3 is an exploded perspective view disclosing elements of the feeder of Figs. 1 and 2;

Fig. 4 is a fragmentary side elevational view of a feeder of modified construction incorporating features and characteristics of the invention; and Fig. 5 is a detail sectional view taken on line 5—5 in Fig. 4.

Figure 2:
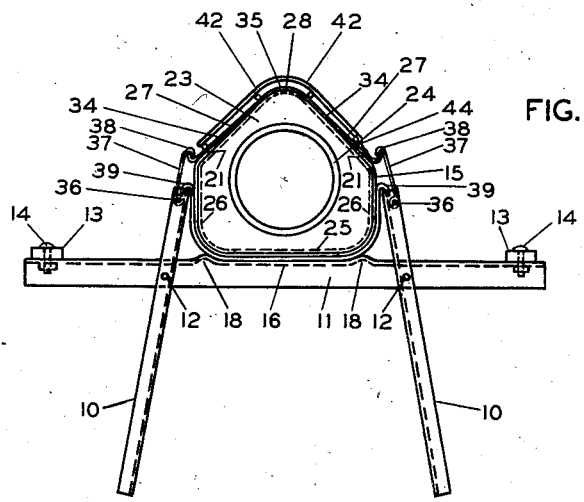
Fig. 2 is an end elevational view of the feeder of Fig. 1.
Figure 1:
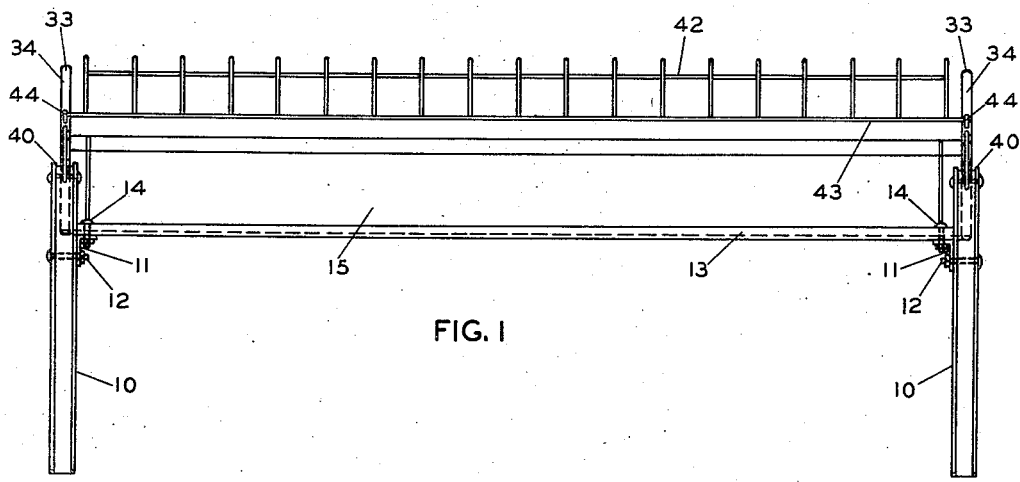
Fig. 1 is a side elevational view of a feeder made according to the invention.

With respect to Figs. 1 to 3 of the drawings, a frame of the feeder includes a set of spaced apart uprights, denoted 10, at each of the opposite ends of said feeder, and each set of uprights 10, 10 carries a transversely extending supporting bar 11. Desirably, the uprights 10 and the transverse supporting bars 11 may be of metal, or of any other rigid material suitable to their purpose. More explicitly, intermediate portions of each transverse supporting bar 11 are removably, pivotally secured, as at 12, 12, to intermediate portions of the uprights 10, 10 at the corresponding end of the feeder. As disclosed, the transverse supporting bars 11 are disposed substantially horizontally.

Longitudinal tie bars, each denoted 13, of the frame are disposed both forwardly and rearwardly of the feeder. More explicitly, the opposite end portions of each longitudinal tie bar 13 are removably secured, as at 14, to the adjacent outer end portions of the transverse supporting bars 11, 11, at the front or rear of the feeder, as the case may be. As disclosed, said longitudinal tie bars 13 are perpendicular to said transverse supporting bars 11 and are parallel with each other.

A trough 15 of the feeder is adapted to be rested upon the transverse supporting bars 11. More explicitly, the trough 15 is adapted to be disposed longitudinally of the feeder, in equally spaced, parallel relation to the longitudinal tie bars 13, and the opposite end portions of said trough are adapted to be carried by saddle portions 16 of the transverse supporting bars 11 situated between the front and rear uprights 10.

As disclosed, the trough 15 is an elongated member open at both ends, and, desirably, said trough can be of about the cross-sectional configuration as best disclosed in Fig. 3 of the drawings, or of some other suitable cross-sectional configuration. The opposite end portions of a relatively wide longitudinally extending base 17 of the trough 15 rest squarely upon the saddle portions 16 of said transverse supporting bars 11 between and engaged with lugs 18, 18 defining said saddle portions, parallel, longitudinally extending lower side walls 19, 19 of said trough extend substantially vertically upward from the opposite sides of said longitudinally extending base 17 of the trough, and longitudinally extending upper side walls 20, 20 of said trough extend obliquely upwardly and inwardly from the longitudinally extending lower side walls 19, 19 of the trough. The upper, inner margins or edges 21, 21 of the longitudinally extending upper side walls 20, 20 are in parallel, substantially spaced apart relation to provide a longitudinal passageway at the upper side of and open to the interior 22 of the trough. The longitudinally extending lower side walls 19, 19 are of substantially equal width, as are also the longitudinally extending upper side walls 20, 20. Desirably, said trough 15 can be of metal, or of other material suitable to the purposes for which the trough is to be employed.

Reinforcing ribs for the trough 15, which extend transversely of said trough and are situated in spaced relation to the ends of the trough as shown, are denoted 29.

Head pieces, each denoted 23, are adapted to be situated in the opposite end portions of the trough 15. As disclosed, each head piece 23 is constituted as a flat slab of rigid material which includes a reinforcing rib 24, circular as shown, arranged intermediately of the head piece. Each head piece 23 is disposed transversely of the trough 15 and is defined at its lower margin or edge by a straight surface 25 of length substantially equal to the width of the longitudinally extending base 17 of the trough 15, at its lower side margins or edges by parallel, straight surfaces 26, 26 which extend vertically upward from the opposite ends of the straight lower surface 25 and are each of length substantially equal to the width of the longitudinally extending lower side walls 19, 19, and at its upper side margins or edges by oblique, straight surfaces 27, 27 which extend upwardly and inwardly from the straight lower side surfaces 26, 26 and meet at an apex 28 of the head piece directly opposite the mid-length of the corresponding straight lower surface 25. The construction and arrangement are such that each head piece 23 can be slid into an end portion of the trough 15 so that its straight lower surface 25 is in proximate relation to the inner surface of an end portion of the longitudinally extending base 17, its straight lower side surfaces 26, 26 are in proximate relation to the inner surfaces of end portions of the longitudinally extending lower side walls 19, 19 and the outer parts of its straight upper side surfaces 27, 27 are in proximate relation to the inner surfaces of end portions of the longitudinally extending upper side walls 20, 20 of said trough 15. The inner parts of the straight upper surfaces 27, 27 of each head piece, between the longitudinally extending upper side walls 20, 20 and the apex 28, extend upwardly and inwardly to a position above the trough 15 when the head pieces 23 are assembled with the troughs.

Mechanism is provided for releasably fastening or locking each of the opposite end portions of the trough 15, with the head piece 23 at the corresponding end of said trough, down upon and against the saddle portions 16, 16 of the transverse supporting bars 11, 11 of the feeder frame, and the set of uprights 10, 10 at each end of the feeder is constituted as a part of the fastening or locking mechanism.

A substantially U-shape strap 30, which can be of metal or other suitable material, of each fastening or locking mechanism includes a base portion 31 of a length substantially equal to the width of the longitudinally extending base 17 of the trough 15, and upwardly extending arms 32, 32 integral with said base portion 31 each of equal length less than a measurement representing the width of each of the lower side walls 19, 19 of said trough 15.

A substantially V-shape strap 33, which can be of metal or other suitable material, of each fastening or locking mechanism includes arms 34, 34 integrally connected, as at 35, and disposed at the same angular relation to each other as are the straight upper side surfaces 27, 27 of the head pieces. Each arm 34 is of a length substantially equal to the length of each straight upper side surface 27.

The upper end portion of each of the uprights 10, 10 of each set of uprights pivotally supports, as at 36, a hook member 37 with hook 38.

In the disclosure as made, each set of uprights 10, 10 is at the outer side of the transverse supporting bar 11 at the corresponding end of the feeder, as is also the corresponding U-shape strap 30, and, in the instance of each of the fastening or locking mechanisms the U-shape strap is between uprights 10, 10.

Hooks 39, 39, one upon the free end of each of the upwardly extending arms 32, 32 of each substantially U-shape strap 30, are adapted to be fitted down over the upper ends 40, 40 of the uprights 10, 10 at the corresponding end of the feeder thus to cause the base portion 31 of the U-shape strap to be situated in proximate relation to the lower surface of the adjacent end portion of the longitudinally extending base 17 of the trough 15 and the upwardly extending arms 32, 32 of said U-shape strap to be situated in proximate relation to the outer surface of the adjacent end portions of the longitudinally extending lower side walls 19, 19 of said trough.

Each substantially V-shaped strap 33 is adapted to be rested upon a head piece 23 so that the arms 34, 34 of the V-shape strap rest upon the straight upper side surfaces 27, 27 of the head piece and the location 35 of union between said arms 34, 34 is at the apex 28 of said head piece. Hooks 41, 41, one upon the free end of each of the arms 34, 34 of each V-shape strap 33, are adapted to be assembled with the hooks 38, 38 upon the set of uprights 10, 10 at the same end of the feeder. In practice, the substantially V-shape straps 33 are first placed in their intended and proper positions, the hook members 37, 37 upon the uprights 10, 10 are swung upwardly and the hooks 38, 38 are forced over and back of the hooks 41, 41, thus to cause the trough 15 to be grasped down upon and against the transverse supporting bars 11.

It will be apparent that when the hooks 39 upon the substantially U-shaped straps 30 are assembled with the upper ends of the uprights 10 and the hooks 38 upon said uprights are assembled with the hooks 41 upon the substantially V-shape strap 33, the uprights will be made rigid with the remainder of the feeder. Evidently, the parts of the feeder can be readily and easily disassembled.

A perforated, elongated, removable cover for the feeder is designated 42. As disclosed, the elongated cover 42 is constituted as a structure consisting of longitudinally and transversely extending wires providing openings through said elongated cover and is of configuration to rest upon the upper surfaces of the substantially V-shape straps 33. Opposite end portions of an outermost longitudinally extending wire 43 of said cover 42 are adapted to removably engage back of keepers 44, one upon each V-shaped strap 33, for the cover.

The longitudinal tie bars 13, 13 are adapted to serve as standing rails for chickens, or other fowl, and to this purpose said elements 13, 13 preferably will be of wood.

The feeder disclosed in Figs. 4 and 5 is substantially like the feeder of Figs. 1 to 3. However, the feeder of said Figs. 4 and 5 includes telescoped troughs 15, 15 which are supported by a frame substantially equivalent to the frame of said Figs. 1 to 3 and are releasably grasped to said frame by fastening or locking mechanism of construction about as hereinbefore described.

In Figs. 4 and 5, adjacent end portions of the troughs 15, 15 are in telescoped relation, the head piece 23 disclosed is assembled with the upper, inner trough at the overlapping location of said troughs, and the fastening or locking mechanism is applied to said head piece and the lower, outer trough. That is to say, the U-shape strap 30 in said Figs. 4 and 5 is fitted up against the outer surface of the lower telescoping trough at the location where the troughs overlap, the head piece 23 is fitted to the interior of the upper telescoping trough at a location directly above the U-shape strap, in the manner as set forth in connection with the disclosure of Figs. 1 to 3, the hooks 39, 39 are releasably engaged with and supported by the upper ends 40, 40 of the uprights 10, 10 and the hooks 38, 38 are releasably engaged with the hooks 41, 41.

It will be apparent that the feeder can be made in different lengths. Whereas the feeder of Figs. 1 to 3 includes a single trough 15, the feeder of Figs. 4 and 5 includes two troughs 15, 15 arranged end to end. Evidently, a feeder made according to the invention can include any selected number of troughs connected together end to end and supported in the manner, or after the fashion, as illustrated and described. Additional duplicate uprights 10, transverse supporting bars 11, longitudinal tie bars 12, U-shape straps 30 and V-shape straps 33 can be employed with additional troughs 15 to the purpose of providing additional feeder length.

In the instance of any embodiment of the invention, head pieces 23 will define or constitute the trough ends, as will be apparent, and the head pieces can be closely fitted so that the troughs can be fluid-tight.

The elements constituting a feeder made according to the invention can be shipped from the factory in knocked down condition and readily and easily assembled by the purchaser.

The troughs 15 can be constructed to be of any unit length or lengths which may be selected, and sufficient duplicate parts for accomplishing erection will be included with each feeder shipment.

The feeder when assembled and in use will be rigid and stable. The uprights will be fixed with relation to the remainder of the frame and the troughs will be fixed upon and down against said frame.

What is claimed is:

1. A feeder comprising a frame, a trough supported upon said frame, head pieces within said trough for closing the ends of the trough, and mechanism constituted as clamping entities engaged with said frame and said head pieces and about said trough for releasably fastening the head pieces in said trough and the trough upon the frame.

2. In a feeder, a frame, an upwardly opening trough supported upon said frame, a head piece within said trough constituting an end closure for the trough, said head piece extending upwardly beyond said trough, and mechanism constituted as a clamping entity engaged with said frame and with a portion of said head piece above said trough and extending about the trough for releasably fastening the head piece in said trough and the trough upon said frame.

3. In a feeder, a frame, upwardly opening telescoping troughs supported upon said frame, a head piece within overlapping portions of said troughs closing off the troughs from each other, said head piece extending upwardly beyond said troughs, and mechanism constituted as a clamping entity engaged with said frame and with a portion of said head piece above said troughs and extending about the troughs for releasably fastening the troughs upon the frame and the head piece in said troughs.

4. In a feeder, a frame including spaced apart uprights and a transverse supporting bar pivoted upon said uprights, an upwardly opening trough supported upon said transverse supporting bar, a head piece within said trough constituting an end closure for the trough, said head piece extending upwardly beyond said trough, and mechanism constituted as a clamping entity engaged with said frame and with a portion of said head piece above said trough and extending about the trough for releasably fastening the head piece in said trough and the trough upon said frame.

5. A feeder comprising a frame including spaced apart sets of spaced apart front and rear uprights, transverse supporting bars including a transverse supporting bar upon the uprights of each of said sets, and longitudinal tie bars including a longitudinal tie bar at the front and a longitudinal tie bar at the rear of said spaced apart sets connected between transverse supporting bars of said frame, a trough between front and rear uprights of the different sets upon said transverse supporting bars, head pieces for closing the ends of said trough, and mechanism constituted as clamping entities engaged with said frame and said head pieces and about said trough for releasably fastening the head pieces in said trough and the trough upon the frame.

6. A feeder comprising a frame including spaced apart sets of spaced apart front and rear uprights, transverse supporting bars including a transverse supporting bar upon the uprights of each of said sets and longitudinal tie bars including a longitudinal tie bar at the front and a longitudinal tie bar at the rear of said spaced apart sets connected between transverse supporting bars of said frame, a trough between front and rear uprights of the different sets upon said transverse supporting bars, head pieces for closing the ends of said trough, hook members pivotally supported by said uprights, and mechanism constituted as a strap beneath and engaged with said trough and supported by the uprights of a set and a strap engaged with each of said head pieces and with the hook members pivotally supported by the uprights of a set for releasably fastening each of the head pieces in said trough and the trough upon the frame.

7. In a feeder, a frame including spaced apart uprights and a transverse supporting bar upon said uprights, an upwardly opening trough supported upon said transverse supporting bar, a head piece within said trough constituting an end closure for the trough, said head piece extending upwardly beyond said trough, hook members pivotally supported by said uprights, and mechanism constituted as a strap beneath and engaged with said trough and supported by said uprights and a strap engaged with a portion of said head piece above said trough and with said hook members supported by said uprights for releasably fastening said head piece in said trough and the trough upon said frame.

8. In a feeder, a frame including spaced apart uprights and a transverse supporting bar upon said uprights, alined upper and lower troughs supported upon said transverse supporting bar having adjacent end portions arranged in telescoping relation, a head piece within said upper trough at the location where the upper and lower troughs overlap closing off said troughs from each other, hook members upon said uprights, and mechanism constituted as a strap engaged with said trough and supported by the uprights and a strap engaged with said head piece and with said hook members upon the uprights for releasably fastening the head piece in said upper trough and said troughs to each other and upon said transversely extending bar.

9. In a feeder, a frame including spaced apart uprights and a transverse supporting bar upon said uprights, alined upper and lower, upwardly opening troughs supported upon said transverse supporting bar having adjacent end portions arranged in telescoping relation, a head piece within said upper trough at the location where the upper and lower troughs overlap closing off said troughs from each other, hook members upon said uprights, and mechanism constituted as a strap engaged beneath said lower trough and supported by said uprights and a strap engaged above said head piece and with said hook members upon the uprights for releasably fastening said head piece in said upper trough and the upper and lower troughs to each other and upon said transverse supporting bar.

STANLEY E. KEAGLE.

REFERENCES CITED

The following references are of record in the file of this patent:

UNITED STATES PATENTS

| Number | Name | Date |
|---|---|---|
| 700,522 | Maginnis | May 20, 1902 |
| 2,347,418 | Kravick | Apr. 25, 1944 |

FOREIGN PATENTS

| Number | Country | Date |
|---|---|---|
| 115,634 | Great Britain | Apr. 30, 1919 |